Oct. 20, 1925.
E. SYSEL
1,558,412
POWER OPERATED DUMPING TRUCK
Filed May 5, 1923 2 Sheets-Sheet 1
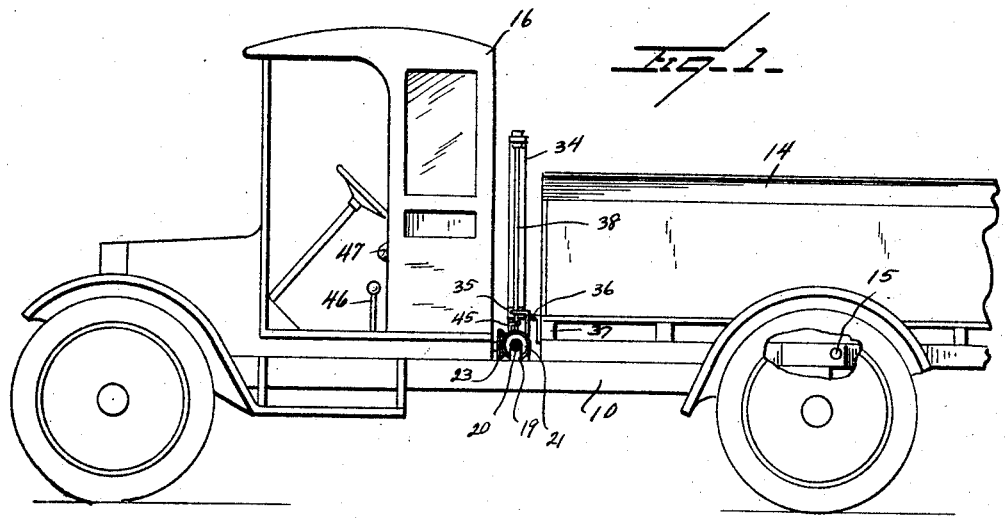
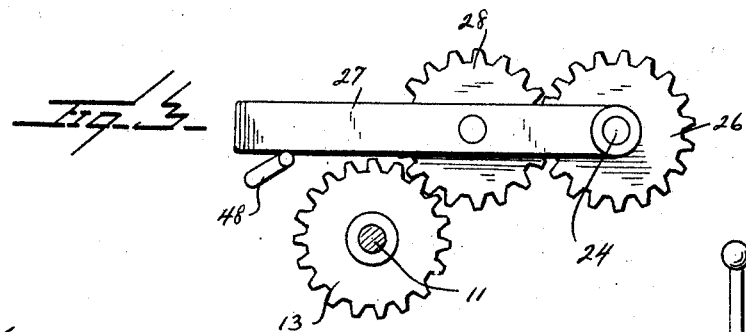
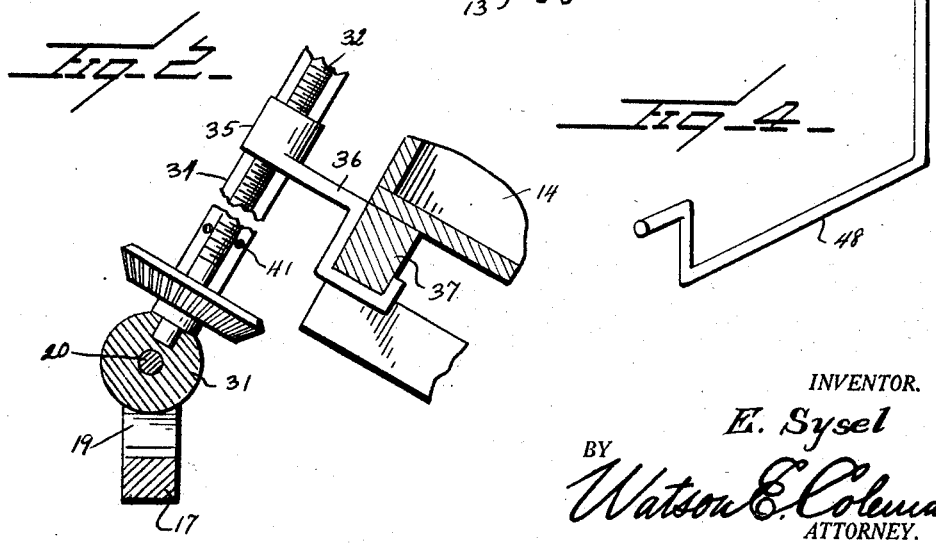
INVENTOR.
E. Sysel
BY Watson E. Coleman
ATTORNEY.

Oct. 20, 1925. 1,558,412
E. SYSEL
POWER OPERATED DUMPING TRUCK
Filed May 5, 1923   2 Sheets-Sheet 2
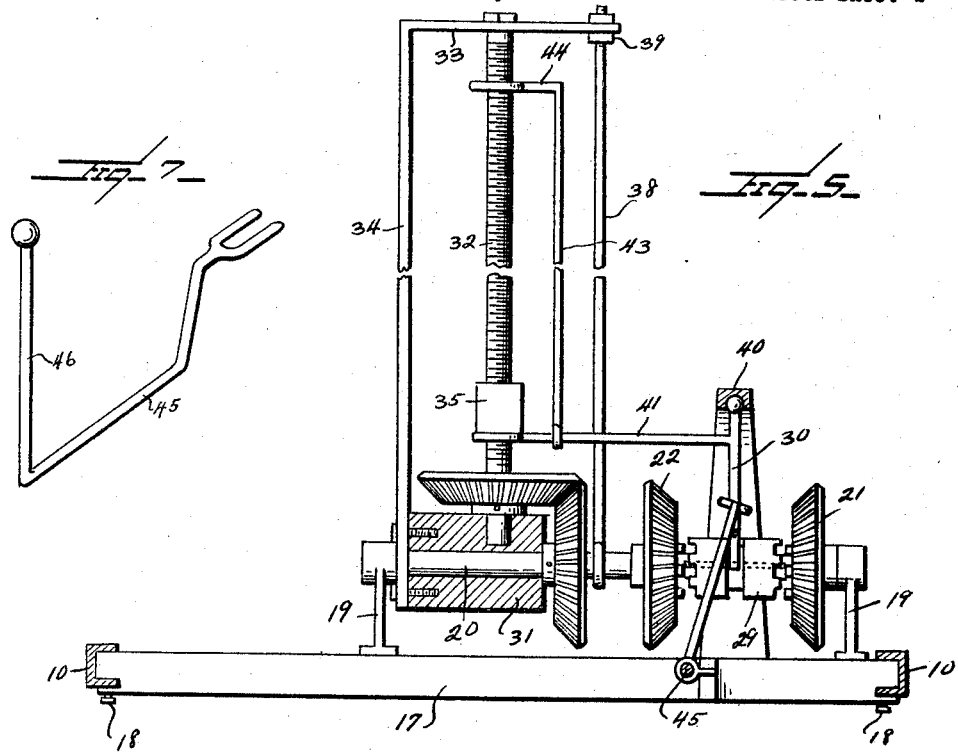
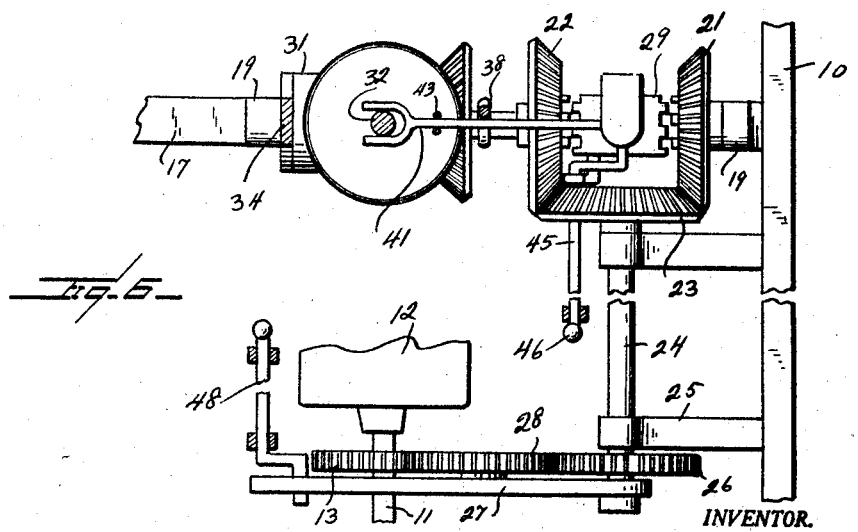
INVENTOR.
E. Sysel
BY Watson E. Coleman
ATTORNEY.

Patented Oct. 20, 1925.

1,558,412

UNITED STATES PATENT OFFICE.

EMAN SYSEL, OF DORCHESTER, NEBRASKA.

POWER-OPERATED DUMPING TRUCK.

Application filed May 5, 1923. Serial No. 636,850.

*To all whom it may concern:*

Be it known that I, EMAN SYSEL, a citizen of the United States, residing at Dorchester, in the county of Saline and State of Nebraska, have invented certain new and useful Improvements in Power-Operated Dumping Trucks, of which the following is a specification, reference being had to the accompanying drawings.

This invention relates to dumping trucks, and particularly to an attachment adapted to be applied to trucks of the Ford type whereby the truck body may be lifted to discharge the contents thereof through the power of the truck motor.

One of the objects of the invention is to provide a mechanism of this character which is very simple, which can be readily controlled by the driver from the seat of the car, and in which the power of the motor is so multiplied that the truck body is raised or lowered readily without straining the engine.

A further object is to provide a device of this character having manually controlled means whereby the motor may be operatively connected to the truck lifting mechanism or disconnected therefrom to shift the truck and to provide manually controlled means whereby the truck body may be either raised or lowered.

A still further object in this connection is to provide means acting automatically when the truck has been completely raised to operatively disconnect the motor from the lifting mechanism so that the truck will be stopped in its movement either upward or downward.

Another object is to provide a device of this character which is relatively simple, may be readily applied to an ordinary form of truck with practically no change or alteration of the parts thereof.

Other objects will appear in the course of the following description.

My invention is illustrated in the accompanying drawings, wherein:—

Figure 1 is a side elevation of a truck having my dumping attachment applied thereto;

Figure 2 is a fragmentary sectional view through the forward end of the dumping body and the sleeve carrying the elevating and depressing screw;

Figure 3 is an elevation of the gearing whereby power is transmitted to the screw;

Figure 4 is a perspective view of the lever 48;

Figure 5 is a section through the truck chassis and through the sleeve 31, showing in elevation the means for operating the screw;

Figure 6 is a top plan view of the construction shown in Figure 5;

Figure 7 is a perspective view of the lever 45.

Referring to the drawings, 10 designates the lateral beams of the truck chassis, 11 designating the crank shaft of the motor 12, and 13 a gear wheel disposed upon said crank shaft. The truck body 14 is hinged at 15, this hinge being at the rear end of the chassis and approximately at the middle of the truck body so that the truck body may be turned from a horizontal to an inclined position or brought back to a horizontal position. The truck body is constructed as usual and needs no special description.

Mounted upon the beams 10 of the chassis and extending transversely across the machine rearward of the cab 16 is a supporting beam 17 which is held to the beams 10 by set screws 18 or in any other suitable manner. This beam 17 supports the bearings 19 for a transverse shaft 20. Loosely mounted upon this shaft 20 are the opposed beveled gear wheels 21 and 22. Coacting with these beveled gear wheels is a beveled gear wheel 23 on a shaft 24 which extends forward and is mounted in suitable bearings, the forward end being mounted in a bearing bracket 25 engaged with one of the beams 10. The forward end of this shaft 24 carries upon it a gear wheel 26, and pivotally mounted upon the shaft 24 is a lever 27 which carries a gear wheel 28 which is adapted to engage with the gear wheel 13 when this lever 27 is lowered. When the lever 27 is raised, however, the gear wheel 28 is disconnected from the gear wheel 13. Obviously, when the lever is lowered a driving connection will be formed between the motor shaft 11 and the shaft 24 which will be transmitted through gear 23 to the gears 22 and 21 which are both in mesh with the gear wheel 23.

These gears 21 and 22 are loose upon the shaft 20, and disposed between the gear wheels 21 and 22 is a longitudinally shiftable clutch member 29 having clutch teeth on its opposite ends adapted to engage confronting clutch teeth on the gears 21 and 22. When this clutch member 29 is in its neutral position no power at all will be transmitted to the shaft 20. When this clutch member, however, is shifted into engagement with the gear 21, the shaft 20 will be rotated in one direction and when it is shifted into engagement with the gear 22 the shaft 20 will be rotated in the reverse direction. This clutch member 29 is shifted by means of a shifting lever 30.

Mounted upon the shaft 20 for free oscillation thereon is a sleeve 31 constituting a bearing for the lower end of a worm or screw-threaded shaft 32, the upper end of which is mounted in a bearing in the transverse bar 33 of the frame. This bar 33 is carried by a vertical bar 34, which in turn is loosely mounted upon the shaft 20 to oscillate with the sleeve 31. Mounted upon this screw-threaded shaft 32 is a nut 35 which carries a rearwardly extending bracket 36 which is formed at its rear end to engage beneath the rear transverse beam 37 of the truck body 14. Thus as the nut moves upward, the forward end of the truck body 14 will be lifted and as the nut moves downward the forward end of the truck body will be depressed. The end of the bar 33 is connected to the shaft 20 by means of a relatively long bolt or rod 38 which has an eye through which the shaft 20 loosely passes and which at its opposite end passes through the extremity of the bar 33 and is provided with a nut 39. The lever 30 whereby the clutch 29 is shifted is pivoted at 40 and has an arm 41 extending at right angles to the lever and bifurcated at its end to embrace the shaft 32. Engaging this arm 41 is a rod 43 which extends up parallel to the rod 38 and at its upper end is angularly bent, as at 44, and has an eye or equivalent member embracing or disposed closely adjacent to the screw 32.

When the nut 35 rises upon the screw 32 to the upper end thereof and engages this arm 44, it will lift the rod 43 and thereby lift the lever 41, shifting the clutch 29 out of engagement with the gear wheel 21 and into neutral position. Thus when the nut 35 reaches its highest elevation, at which time the truck body 14 has been fully elevated, the nut will strike the arm 44 and shift the clutch member 29 to its neutral position, thus stopping the movement of the elevating screw 32 and holding the truck body in its elevated position.

For the purpose of shifting the clutch member 29 from its neutral position into engagement with the gear wheel 22 to thus lower the truck body under power, I provide a hand operated lever 45, this lever being pivoted intermediate its ends and having a loose connection with the arm 30 and being provided with a handle 46 disposed adjacent the driver's seat 47. Thus when this lever 46 is operated, the lever 30 will be operated to shift the clutch member 29 into engagement with the gear 22 and then the nut 35 will be lowered. When the nut 35 reaches its lowest position it will strike the arm 41, thus depressing this arm and again shifting the clutch member 29 back to its neutral position. Thus there is no chance of breakage, as it will be obvious that the screw 32 cannot rotate after the truck body has been fully lifted and cannot rotate after the truck body has been fully lowered. The gear shifting lever 27 which carries the gear 28 is operated by means of a manually operable lever 48 which is disposed adjacent the seat 47 within the cab 16 so that thus the driver has control of the gear shifting lever 27 and of the clutch member 29 at all times. He can thus cause the rotation of the forward end of the truck to any desired height without of necessity causing the truck to move to its very highest point. Thus, for instance, if a relatively small load is to be discharged there is no necessity of the truck moving to its most inclined position, or under some circumstances it is not desirable to discharge all of the load and hence the driver can stop the movement of the truck at any desired point by operating the lever 46 and causing the disconnection of the clutch member 29 from the gear wheel 21.

It will be noted that the shaft 32 and the frame 34 which supports this shaft is tiltable around the axis of the shaft 20 so that this screw shaft 32 and its frame will tilt over as the truck body is elevated and tilt back to a vertical position when the truck body is lowered.

A mechanism of this character has been found to be very effective in actual practice and may be readily applied to an ordinary Ford truck. While I have particularly designed it with reference to Ford trucks, it may be also used with other forms of dumping trucks and obviously may be modified in many ways to suit different forms of truck without departing from the spirit of the invention as embodied in the appended claim.

I claim:—

In a dumping truck, a chassis, a body pivoted thereon, a horizontal shaft journaled upon the chassis in transverse relation thereto, a frame pivoted on said shaft and extending in a normally upright position, a support journally mounted on the shaft within the frame, a feed screw journaled in the frame and in said support and carrying a bevel gear, a bevel gear on said shaft meshing with said first named bevel gear, clutch operated transmission gearing on said shaft for rotating the same in a selected direction, the clutch mechanism including a slidable member splined upon the shaft, and a pivoted fork engaging the same, a nut member carried by the truck body and operatively engaged upon said feed screw, an arm on said forked lever adapted to be engaged by said nut at one limit of the movement thereof, and a stop disposed about the upper end of the feed screw and connected with said lever and adapted to be engaged by the nut at the upper limit of its movement.

In testimony whereof I hereunto affix my signature.

EMAN SYSEL.